(12) United States Patent
Anantharam et al.

(10) Patent No.: US 8,780,931 B2
(45) Date of Patent: Jul. 15, 2014

(54) MULTI-ROLE DISTRIBUTED LINE CARD

(75) Inventors: Sushma Anantharam, Cupertino, CA (US); Alexander Philip Campbell, Kanata (CA); Keshav Govind Kamble, Fremont, CA (US); Dar-Ren Leu, San Jose, CA (US); Vijoy A. Pandey, San Jose, CA (US); Nandakumar Peethambaram, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 13/469,715

(22) Filed: May 11, 2012

(65) Prior Publication Data

US 2012/0287926 A1    Nov. 15, 2012

Related U.S. Application Data

(60) Provisional application No. 61/486,257, filed on May 14, 2011.

(51) Int. Cl.
*H04L 12/66* (2006.01)

(52) U.S. Cl.
USPC .......................................... 370/463

(58) Field of Classification Search
USPC ......... 370/252, 254, 351, 352, 355, 392, 400, 370/401, 419, 463
See application file for complete search history.

(56) References Cited

U.S. PATENT DOCUMENTS

| | | | |
|---|---|---|---|
| 6,826,195 B1 * | 11/2004 | Nikolich et al. | 370/465 |
| 7,197,042 B2 | 3/2007 | Norman et al. | |
| 2004/0028063 A1 * | 2/2004 | Roy et al. | 370/402 |
| 2004/0088538 A1 * | 5/2004 | Isip et al. | 713/153 |
| 2008/0250120 A1 * | 10/2008 | Mick et al. | 709/219 |
| 2011/0066909 A1 * | 3/2011 | Skirmont et al. | 714/746 |
| 2012/0173935 A1 * | 7/2012 | Skirmont et al. | 714/704 |

OTHER PUBLICATIONS

Cisco Systems, "Cisco CRS Carrier Routing System Multishelf System Interconnection and Cabling Guide", Sep. 2011, San Jose, CA; 84 pages.

* cited by examiner

*Primary Examiner* — Kerri Rose
(74) *Attorney, Agent, or Firm* — Schmeiser Olsen & Watts LLP; Michael Rodriguez

(57) ABSTRACT

A switch includes network ports and a network processor with a fabric interface that provides SerDes (Serializer/Deserializer) channels. The network processor divides each packet received over the network ports into cells and distributes the cells across the SerDes channels. Fabric ports of the switch communicate with the fabric interface to transmit cells to and receive cells from the fabric interface. The switch is selectively configurable as a standalone switch by connecting each fabric port of the switch to another of the fabric ports of the switch, as a member of a switch stack by connecting each fabric port of the switch to a different other switch through one fabric port of that other switch, or as a member of a distributed fabric system by connecting each fabric port of the switch to a different scaled-out fabric coupler (SFC) chassis by an SFC fabric port of that SFC chassis.

16 Claims, 6 Drawing Sheets

MULTI-ROLE DISTRIBUTED LINE CARD

RELATED APPLICATION

This application claims priority to and the benefit of U.S. provisional application No. 61/486,257, filed on May 14, 2011, titled "Distributed Chassis System Architecture," the entirety of which provisional application is incorporated by reference herein.

FIELD OF THE INVENTION

The invention relates generally to data centers and data processing. More particularly, the invention relates to a multi-role network switching line card.

BACKGROUND

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. The infrastructure of the data center, specifically, the connectivity of network switches within the data center, plays a central role in the support of the services. The architecture of the network switches can be instrumental to scalability, that is, the ability to grow the size of the data center.

SUMMARY

In one aspect, the invention features a network switch comprising a plurality of network ports receiving packets over a network. A network processor is in communication with the network ports. The network processor has a fabric interface that provides a plurality of SerDes (Serializer/Deserializer) channels. The network processor divides each packet received over the network ports into a plurality of cells and distributes the cells of each received packet across the SerDes channels. A plurality of fabric ports is in communication with the fabric interface of the network processor to transmit cells to and receive cells from the fabric interface. Each of the fabric ports is connected to one of the other fabric ports to produce a standalone network switch.

In another aspect, the invention features a switch stack comprising a plurality of network switches. Each network switch comprises a plurality of network ports receiving packets over a network. A network processor is in communication with the network ports. The network processor has a fabric interface that provides a plurality of SerDes (Serializer/Deserializer) channels. The network processor divides each packet received over the network ports into a plurality of cells and distributes the cells of each received packet across the SerDes channels. A plurality of fabric ports is in communication with the fabric interface of the network processor to transmit cells to and receive cells from the fabric interface. Each fabric port of each network switch is connected to a different one of the other network switches through one of the fabric ports of that other network switch, such that each network switch is connected to every other network switch in the switch stack.

In still another aspect, the invention features a distributed fabric system comprising a plurality of scaled-out fabric coupler (SFC) chassis. Each SFC chassis has a plurality of SFC fabric ports and one or more cell-based switch fabric elements for switching cells among the SFC fabric ports. The distributed fabric system further includes a plurality of distributed line card (DLC) chassis. Each DLC chassis comprises a plurality of network ports receiving packets over a network and a network processor in communication with the network ports. The network processor has a fabric interface that provides a plurality of SerDes (Serializer/Deserializer) channels. The network processor divides each packet received over the network ports into a plurality of cells and distributes the cells of each received packet across the SerDes channels. A plurality of DLC fabric ports is in communication with the fabric interface of the network processor to transmit cells to and receive cells from the fabric interface. Each DLC fabric port of each DLC chassis is connected to a different one of the SFC chassis by one of the SFC fabric ports of that SFC chassis, such that each DLC chassis is connected to every SFC chassis to form the distributed fabric system.

In still another aspect, the invention features a network switch comprising a plurality of network ports receiving packets over a network and a network processor in communication with the network ports. The network processor has a fabric interface that provides a plurality of SerDes (Serializer/ Deserializer) channels. The network processor divides each packet received over the network ports into a plurality of cells and distributes the cells of each received packet across the SerDes channels. A plurality of fabric ports is in communication with the fabric interface of the network processor to transmit cells to and receive cells from the fabric interface. The network switch is selectively configurable as a standalone network switch by connecting each of the fabric ports to one of the other fabric ports of the network switch, as a member of a switch stack by connecting each fabric port of the network switch to another different network switch through one of the fabric ports of that other network switch, or as a member of a distributed fabric system by connecting each fabric port of the network switch to a different scaled-out fabric coupler (SFC) chassis by an SFC fabric port of that SFC chassis.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Described herein are multi-role network switch chassis or boxes capable of assuming a variety of configurations, including a standalone configuration, a stackable switch configuration, and a distributed fabric configuration. Depending on the application for the network switch, an administrator can selectively configure the network switch into any one of these configurations by appropriately connecting its fabric ports to each other, to fabric ports of other network switches, or to fabric ports of scaled-out fabric coupler (SFC) chassis. The flexible architecture of the network switching chassis enables data centers to scale to tens of thousands of network switching ports.

Figure 1:
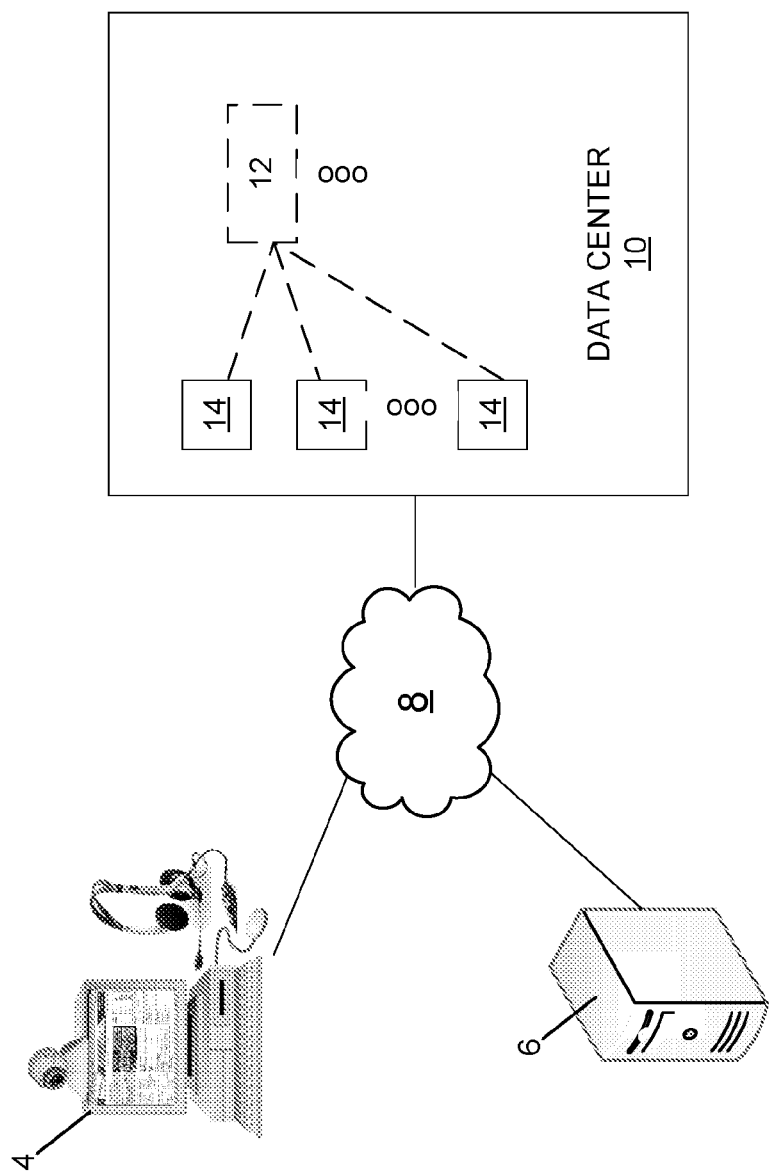
FIG. 1 is an embodiment of a networking environment including a data center, a server, and a management station.

FIG. 1 shows an embodiment of a networking environment 2 including a data center 10 in communication with a management station 4 and a server 6 over a network 8. Embodiments of the network 8 include, but are not limited to, local-area networks (LAN), metro-area networks (MAN), and wide-area networks (WAN), such as the Internet or World Wide Web. The data center 10 is generally a facility that houses various computers, routers, switches, and other associated equipment in support of applications and data that are integral to the operation of a business, organization, or other entities. The equipment of the data center 10 includes network elements 14, referred to herein as distributed line cards (DLCs). The DLC chassis 14 can be in communication with one or more SFC chassis 12 to form a distributed fabric system, as described in more detail below. The data center 10 may be embodied at a single site or distributed among multiple sites. Although shown outside of the data center 10, either (or both) of the management station 4 and server 6 may be considered part of the data center 10.

The management station 4 can connect directly (point-to-point) or indirectly to a given DLC chassis 14 of the data center 10 over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)). Using a network protocol, such as Telnet, the management station 4 can access a command-line interface (CLI) of a given DLC chassis 14 or a central control plane of the whole distributed system, which includes all DLC chassis 14 and all SFCs 12. In general, the server 6 is a computer (or group of computers) that provides one or more services to the data center 10, examples of which include, but are not limited to, email servers, proxy servers, DNS servers.

Figure 2:
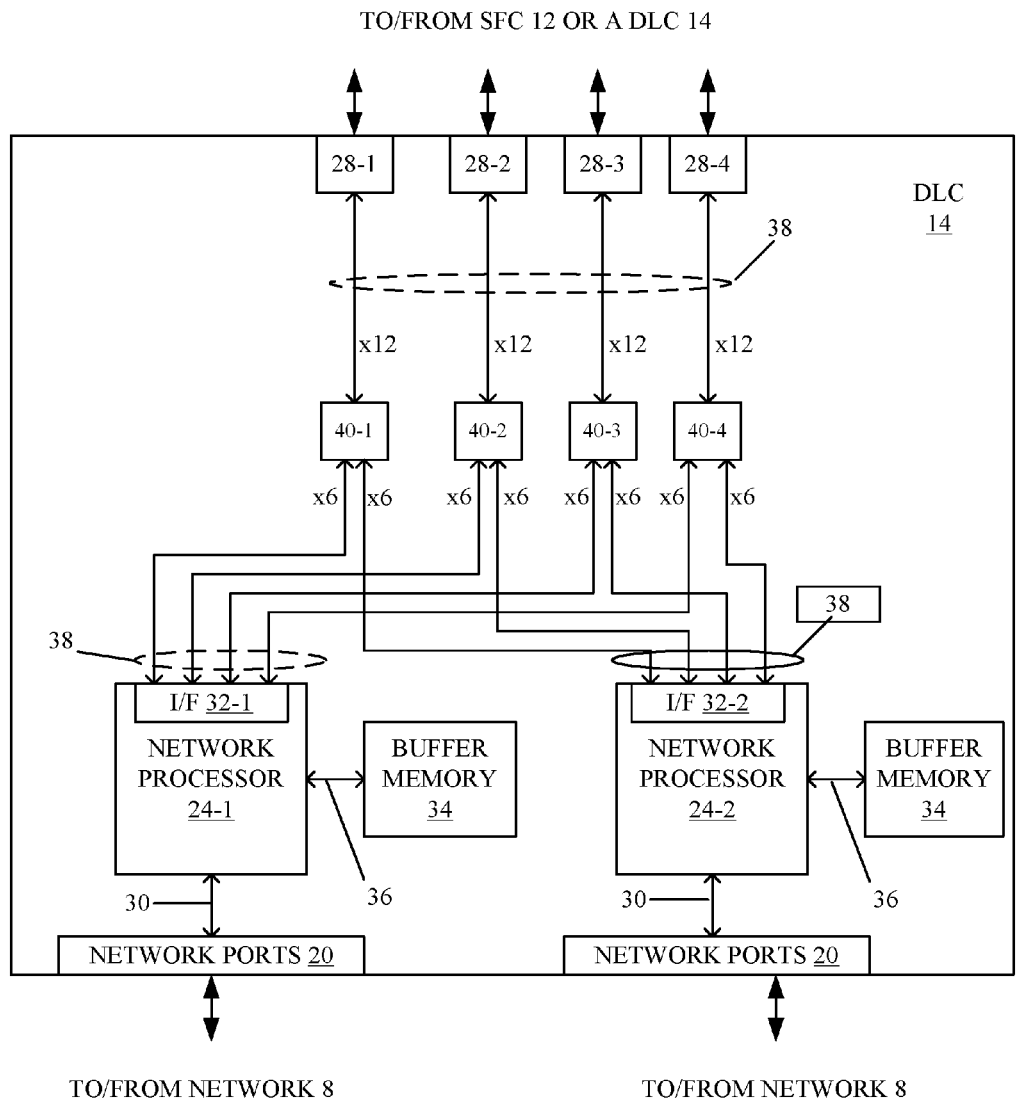
FIG. 2 is a functional block diagram of an embodiment of a distributed line card (DLC) chassis including two network processors, each with a fabric interface.

FIG. 2 shows an embodiment of a DLC chassis 14 that can be deployed in the data center 10. The DLC chassis 14 generally has a plurality of network ports 20 for communicating over the network 8, one or more network processors 24, and a plurality of fabric ports 28. In this embodiment, the DLC chassis 14 has forty network ports 20, each configured as a 10 Gbps Ethernet port, two network processors 24-1, 24-2, and four fabric ports 28. The aggregate network bandwidth of this embodiment of DLC chassis 14 is 400 Gbps. The network ports 20 are in communication with the network 8 external to the switched domain, such as the Internet. Other embodiments of DLC chassis can have fewer or more network ports, network processors, and fabric ports than those shown in the embodiment of FIG. 2.

Each network processor 24 is in communication with a subset (here, one-half) of the network ports 20 through PHY interfaces 30. In addition, each network processor 24-1, 24-2 of the DLC chassis 14 has a fabric interface (I/F) 32-1, 32-2, respectively, and is in communication with buffer memory 34 over memory channels 36. The fabric interface 32 of each network processor 24 provides SerDes channels 38, preferably twenty-four in number. These twenty-four SerDes channels 38 are grouped into four sets of six channels each. Each SerDes channel provides, for example, approximately 10.3 Gbps to 11.5 Gbps of bandwidth. In another embodiment, each SerDes channel provides approximately 25 Gbps of bandwidth. The DLC chassis 14 further includes PHYs 40-1, 40-2, 40-3, 40-4 (generally 40) in communication with the four fabric ports 28-1, 28-2, 28-3, 28-4, respectively, of the DLC chassis 14. In addition, each of the PHYs 40 is in communication with a group of six SerDes channels 38 from each of the two network processors 24-1, 24-2; accordingly, each PHY 40 supports twelve SerDes channels 38. An example implementation of the network processors 24 is the BCM 88650, a 20-port, 10 GbE switch chip produced by Broadcom, of Irvine, Calif.

The fabric interface 32 of each network processor 24 is in communication with every DLC fabric port 28 through the PHYs 40 over the SerDes channels 38. Preferably, each fabric port 28 of the DLC chassis 14 includes a standard form-factor pluggable 120 Gbps CXP interface. Through these standard pluggable interfaces, the network processors 24 transmit and receive proprietary cell-based payload over the SerDes channels 38. In brief, each network processor 24 splits packets received on its network ports 20 into cells and distributes the cells across the SerDes channels 38; and, in the opposite direction, each network processor 24 reassembles packets from cells arriving from its fabric ports 28 over the SerDes channels 38 and forwards the packets to the network 8 through the network ports 20.

Each pluggable interface provides a given number of lanes over which to transmit and receive the cells, with each lane of each pluggable interface being mapped to one of the SerDes channels provided by the fabric interfaces 32. In one embodiment, the CXP interface has twelve transmit and twelve receive lanes (12×), each lane providing a 10 Gbps channel. A description of the 120 Gbps 12×CXP interface can be found in the "Supplement to InfiniBand™ Architecture Specification Volume 2 Release 1.2.1", published by the InfiniBand™ Trade Association. This embodiment of 12-lane CXP is referred to as the standard Infiniband (IB) CXP. In another embodiment, the CXP interface has 10 lanes (10×) for supporting 10-lane applications, such as 100 Gigabit Ethernet. This embodiment of 10-lane CXP is referred to as the Ethernet CXP.

Preferably, an equal number of SerDes channels of each fabric interface 32 is mapped to each of the pluggable interfaces. Accordingly, any given pluggable interface is connected to each of the fabric interfaces by the same number of lanes. This configuration facilitates scalability, that is, the growth of the data center through an increase in the number of DLC chassis 14 and/or in the number of network processors 24 in the DLCs.

Figure 3:
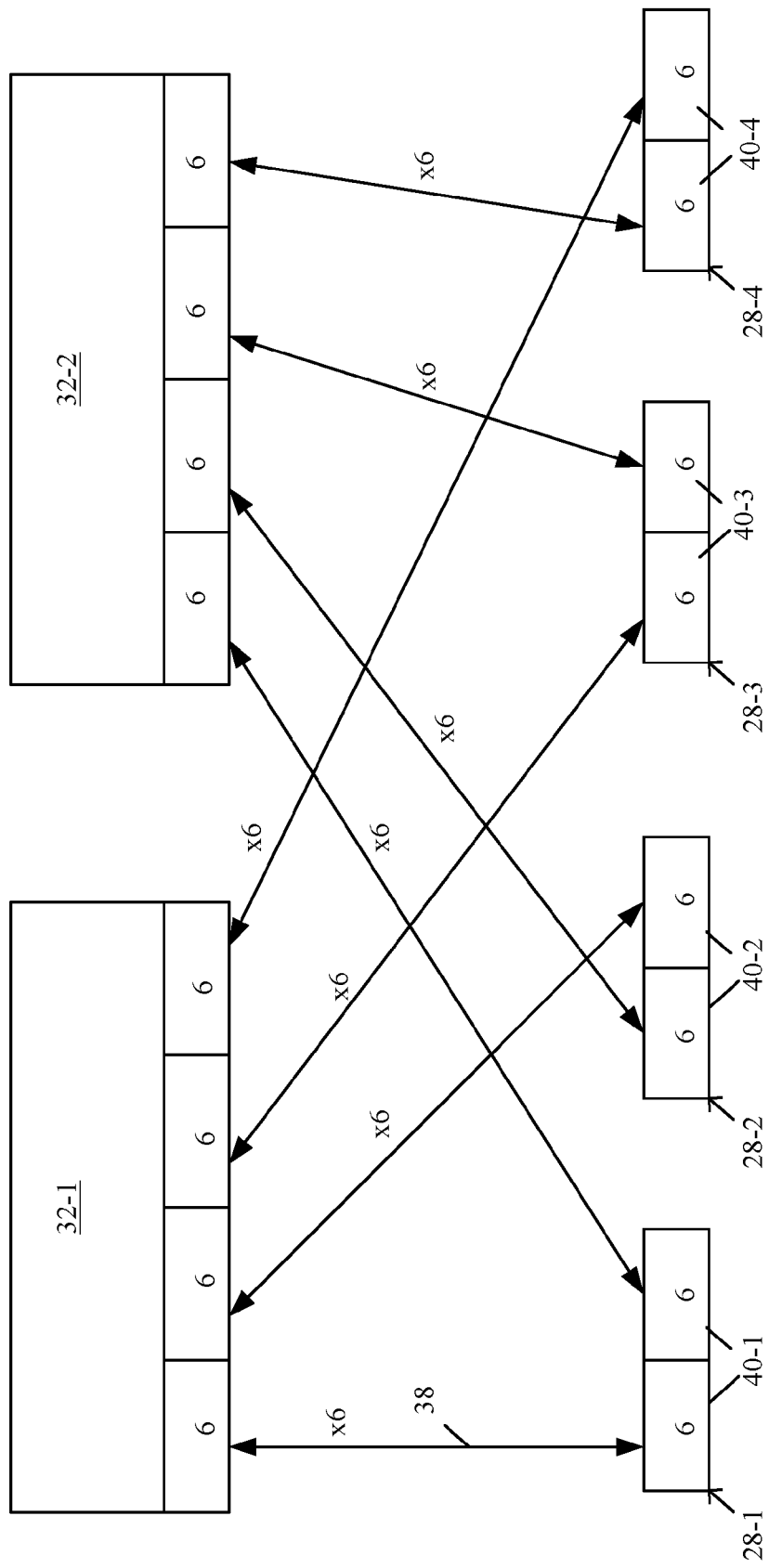
FIG. 3 is a diagram of an embodiment of interconnections between the fabric interfaces of the two network processors and the CXP/PHYs of a two-switch DLC.

FIG. 3 shows an embodiment of the interface connections between the fabric interfaces 32 of the two network processors 24 and the CXP fabric ports 28 of the DLC chassis 14. In FIG. 3, the PHYs 40-1, 40-2, 40-3, and 40-4 are incorporated into the CXP fabric ports 28-1, 28-2, 28-3, and 28-4, respectively, with each CXP fabric port 28 supporting twelve lanes. These twelve lanes map to six SerDes channels from each of the two fabric interfaces 32-1, 32-2. Each fabric interface 32 provides twenty-four SerDes channels 38 divided into four groups of six channels. For each of the fabric interfaces 32, one group of six SerDes channels 38 passes to a different one of the four fabric ports 28. For example, one group of six SerDes channels from each fabric interface 32-1, 32-2 maps to the PHYs 40-1 of the CXP fabric port 28-1, a second group of six SerDes channels from each fabric interface 32-1, 32-2 maps to the PHYs 40-2 of the CXP fabric port 28-2, a third group of six SerDes channels from each fabric interface 32-1, 32-2 maps to the PHYs 40-3 of the CXP fabric port 28-3, and a fourth group of six SerDes channels from each fabric interface 32-1, 32-2 maps to the PHYs 40-4 of the CXP fabric port 28-4.

Figure 4:
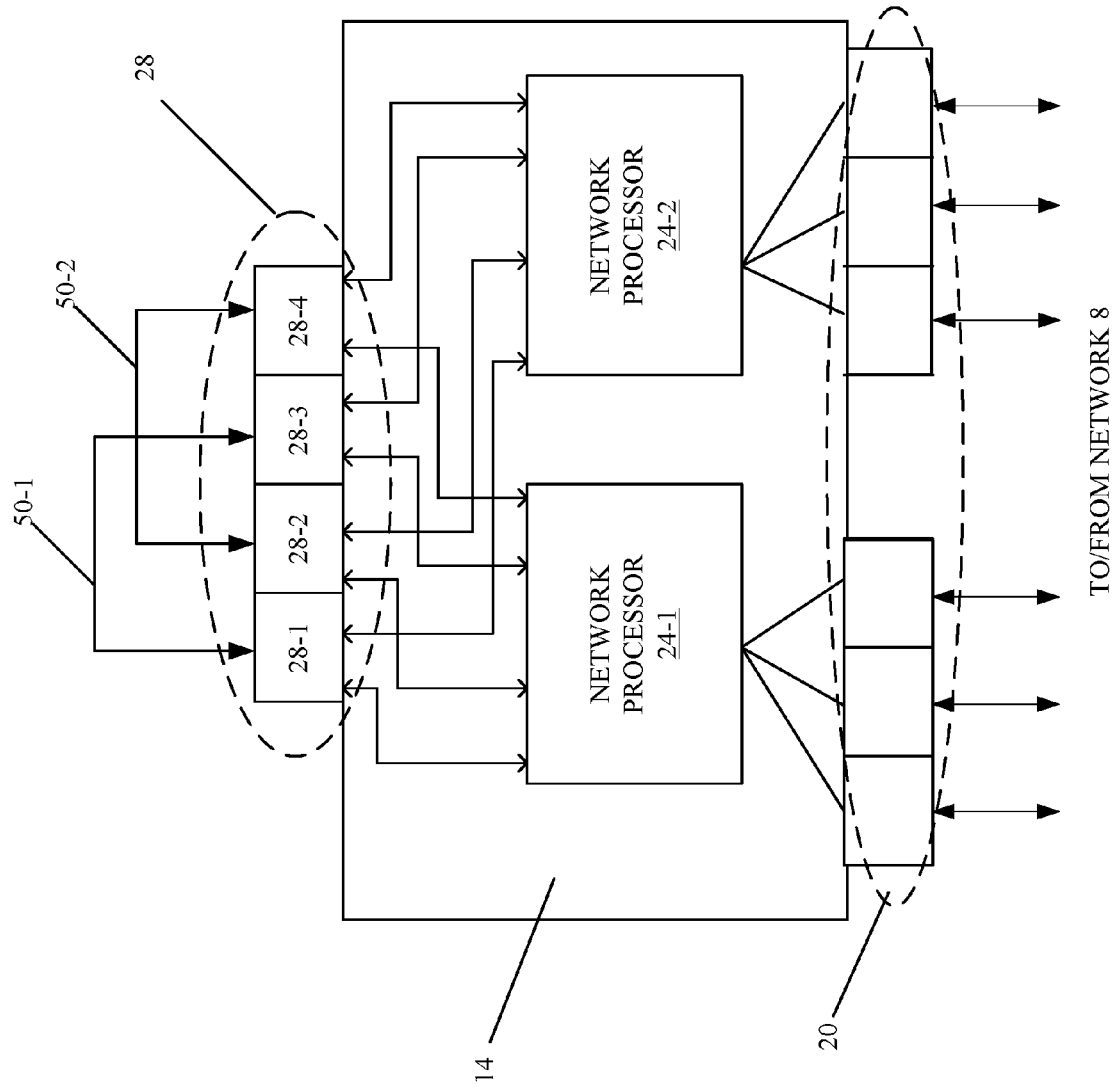
FIG. 4 is a diagram of the DLC of FIG. 2 configured as a standalone network switch chassis.

FIG. 4 shows the DLC chassis 14 of FIG. 2 configured as a standalone switch chassis. In this configuration, a wire or cable connects each DLC fabric port 28 to another of the DLC fabric ports 28. Interconnect variants include Direct Attached Cable (DAC) or optical cable. For example, interconnect 50-1 connects fabric port 28-1 to fabric port 28-3 and interconnect 50-2 connects fabric ports 28-2 to fabric port 28-4. Other permutations of interconnections between fabric ports 28 of the same DLC chassis can be implemented to produce a standalone switch chassis. In addition, a DLC chassis 14 configured as a standalone switch chassis can have as few as two fabric ports 28.

Figure 5:
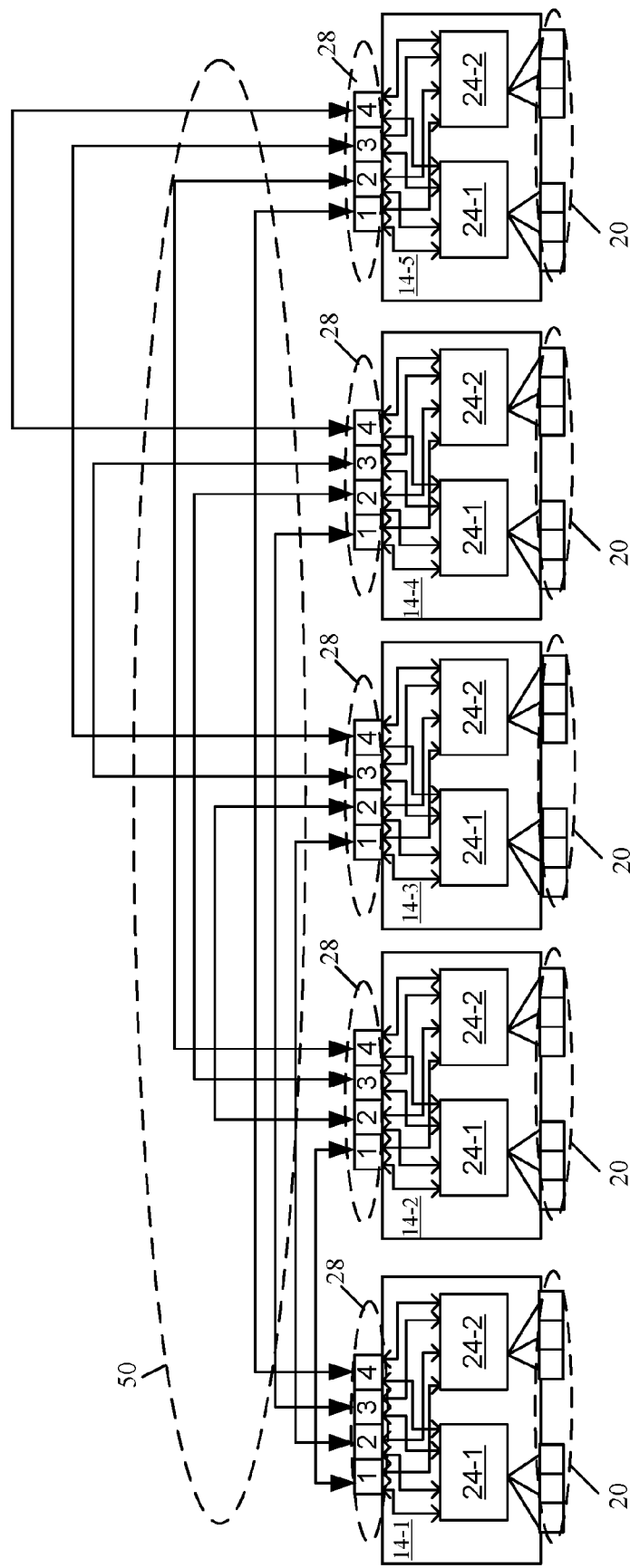
FIG. 5 is a diagram of a plurality of DLC chassis of FIG. 2 configured in a stackable switch configuration.

FIG. 5 shows an example of a plurality of DLC chassis 14 connected in a switch stack configuration by wires or cables 50. This example includes five DLC chassis 14-1 through 14-15 (generally, DLC chassis 14), with each DLC chassis 14 having four fabric ports 28. Each fabric port 28 of each DLC chassis 14 is connected to a fabric port 28 of a different one of the other DLCs. DLC chassis 14-1, for example, has one fabric port 28-1 connected to a fabric port 28-1 of DLC chassis 14-2, a second fabric port 28-2 connected to fabric port 28-1 of DLC chassis 14-3, a third fabric port 28-3 connected to fabric port 28-1 of DLC chassis 14-4, and a fourth fabric port 28-4 connected to fabric port 28-1 of DLC-14-5. The connectivity among the DLC chassis 14 produces a full-mesh configuration.

The example of FIG. 5 is merely illustrative. A switch stack can have as few as two DLC chassis 14. In general, the number of DLCs in a switch stack is a factor of the number of fabric ports 28 in the DLC chassis 14. In general, representing the number of fabric ports in a DLC with N, the total number of DLCs in the switch stack is equal to N+1.

Figure 6:
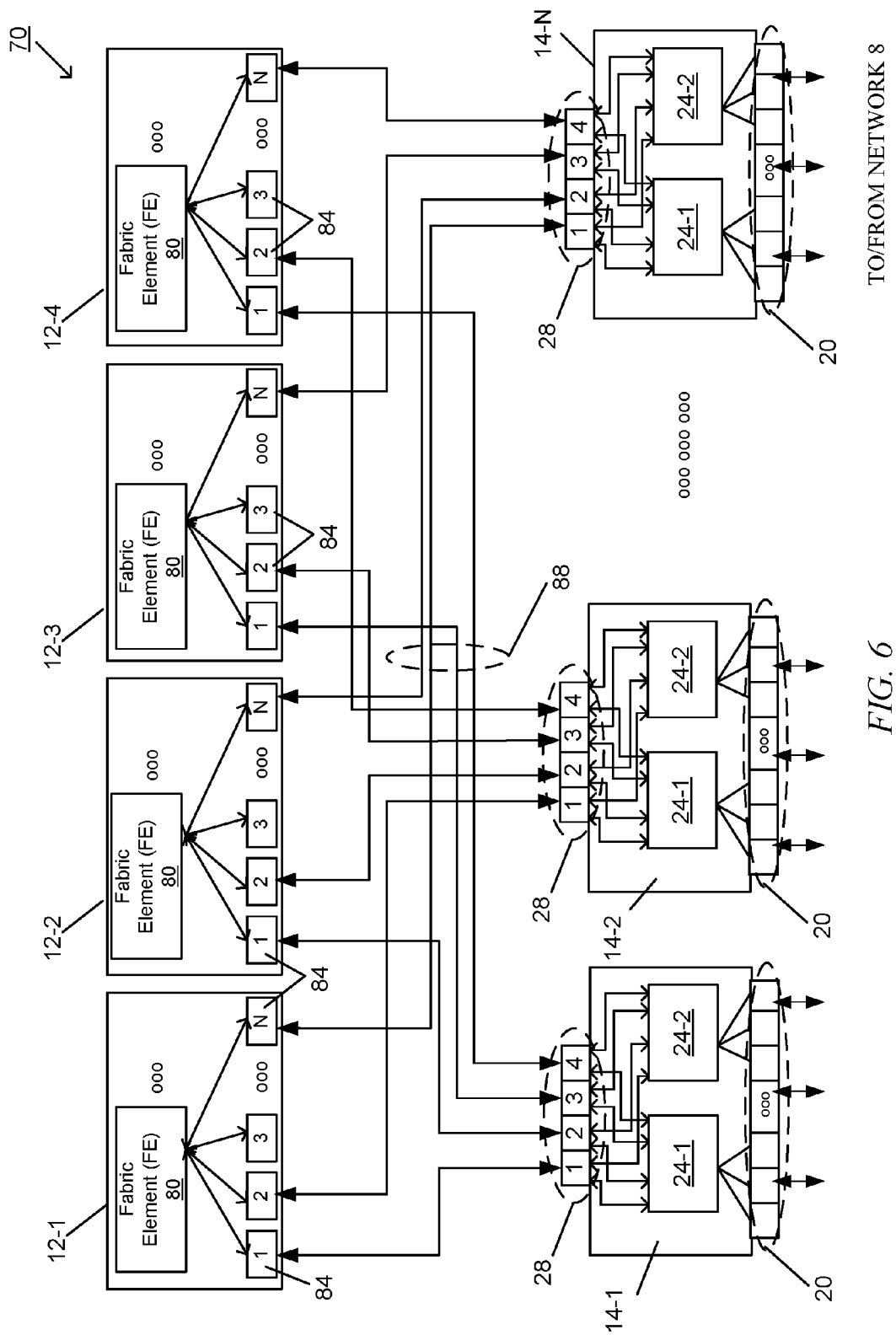
FIG. 6 is a diagram of an embodiment of a plurality of DLC chassis of FIG. 2 configured in a distributed fabric system.

FIG. 6 shows an example of DLC chassis 14 connected in a distributed fabric system configuration. In this example, a distributed fabric system 70 has N DLC chassis 14-1, 14-2, 14-N (generally, 14) in communication with four SFC chassis 12-1, 12-2, 12-3, and 12-4 (generally, 12). The number, N, of DLCs can range in the hundreds and thousands. The SFCs 12 and DLC chassis 14 are part of a single cell-based switched domain.

Each SFC chassis 12 includes a set of cell-based switch fabric elements (FE) 80 in communication with N SFC fabric ports 84, there being at least as many SFC fabric ports 84 in each SFC chassis 12 as the number of DLC chassis 14 in the distributed fabric system. Each set of fabric elements 80 of an SFC chassis 12 switches cells between fabric ports 84 based on the destination information in the cell header. An example implementation of the switch fabric elements 80 is the FE 1600 (BCM 88750), a fabric element produced by Broadcom, of Irvine, Calif.

In this example, each DLC chassis 14 has network ports 28, two network processors 24-1, 24-2, and four fabric ports 28. In one embodiment, each DLC chassis 14 has forty network ports 20, with each of the network ports 20 being configured as a 10 Gbps Ethernet port. The aggregate network bandwidth of the DLC chassis 14 is 400 Gbps. In other embodiments, the network ports 20 can be configured as 40 Gigabit or 100 Gigabit Ethernet ports. The network ports 28 are in communication with the network 8 external to the switched domain, such as the Internet.

The distributed fabric system 70 has a full-mesh configuration: each DLC chassis 14 is in communication with each of the SFCs 12; more specifically, each of the fabric ports 28 of a given DLC chassis 14 is in electrical communication with a fabric port 84 of a different one of the SFCs 12 over a communication link 88. Referring to the DLC chassis 14-1 as a representative example, the DLC fabric port 28-1 of the DLC chassis 14-1 is in communication with the fabric port 84-1 of the SFC 12-1, the DLC fabric port 28-2 with the fabric port 84-1 of the SFC 12-2, the DLC fabric port 28-3 with the fabric port 84-1 of the SFC 12-3, and the DLC fabric port 28-4 with the fabric port 84-1 of the SFC 12-4. Connected in this full-mesh configuration, the DLCs and SFCs form the distributed fabric system, with the DLCs acting as line cards. As an example, four 256-fabric port SFC chassis 12 together can connect up to 256 DLC chassis 14. The distributed fabric system 70 is modular; that is, DLC chassis 14 can be added to or removed from the distributed fabric system, one at a time, similar to adding line cards to or removing line cards from a chassis.

The communication link 88 between each DLC fabric port 28 and an SFC fabric port 84 can be a wired connection. Interconnect variants include Direct Attached Cable (DAC) or optical cable. DAC provides five to seven meters of cable length; whereas the optical cable offers up to 100 meters of connectivity within the data center, (standard optical connectivity can exceed 10 km). Alternatively, the communication link 88 can be a direct physical connection (i.e., electrical connectors of the DLC fabric ports 28 physically connect directly to electrical connectors of the SFC fabric ports 84).

During operation of the distributed fabric system 70, packets arrive at a network port 20 of one of the DLC chassis 14. The network processor 24 of the DLC chassis 14 receives each packet and adds metadata/pre-classification header to each packet. Network processor 24 then partitions the packet into one or more fixed size cells. The network processor 24 sends the cells out through the fabric ports 28 to each of the SFCs 12, sending different cells to different SFCs 12. For example, consider an incoming packet with a length of 1600 bits. The receiving network processor 24 of the DLC chassis 14 can split the packet into four cells of 400 bits (before adding header information to those cells). The network processor 24 then sends a different cell to each of the four SFC chassis 12, in effect, achieving a load balancing of the cells across the SFCs 12.

A cell-based switch fabric element 80 of each SFC 12 receiving a cell examines the header of that cell, determines its destination, and sends the cell out through the appropriate one of the fabric ports 84 of that SFC to the destination DLC chassis 14. The destination DLC chassis 14 receives all cells related to the original packet from the SFCs, reassembles the original packet (i.e., removing the added headers, combining cells), and sends the reassembled packet out through the appropriate one of its network ports 20. Continuing with the previous four-cell example, consider that each SFC determines that the destination DLC is DLC chassis 14-2. Each SFC 12 sends its cell out through its fabric port 84-2 to the DLC chassis 14-2. The DLC chassis 14-2 reassembles the packet from the four received cells (the added headers providing an order in which to combine the cells) and sends the packet out of the appropriate network port 20. The pre-classification header information in the cells determines the appropriate network port.

The full-mesh configuration of FIG. 6, having the four SFC chassis 12, is a full-line rate configuration, that is, the aggregate bandwidth for transmitting cells from a given DLC to the SFCs (i.e., 480 Gbps) is greater than the aggregate bandwidth of packets arriving at the given DLC on the network ports 20 (i.e., 400 Gbps). The configuration can also be adapted to support various oversubscription permutations for DLC chassis 14. For example, instead of having four SFCs, the distributed fabric system may have only two SFC chassis 12-1, 12-2, with each DLC chassis 14 using only two fabric ports 28 for communicating with the SFC chassis 12, one fabric port 28 for each of the SFC chassis 12. This permutation of oversubscription has, for example, each DLC on its network side with an aggregate ingress 400 Gbps bandwidth (forty 10 Gbps Ethernet Ports) and an aggregate egress 240 Gbps cell-switching bandwidth on its two 120 Gbps fabric ports 48 for communicating with the two SFCs. Other oversubscription permutations can be practiced.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C#, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A switch stack comprising:
    a plurality of network switches, each network switch comprising:
        a plurality of network ports receiving packets over a network;
        a network processor in communication with the network ports, the network processor having a fabric interface that provides a plurality of SerDes (Serializer/Deserializer) channels, the network processor dividing each packet received over the network ports into a plurality of cells and distributing the cells of each received packet across the SerDes channels; and
        a plurality of fabric ports in communication with the fabric interface of the network processor to transmit cells to and receive cells from the fabric interface,
    wherein each fabric port of each network switch is connected to a different one of the other network switches through one of the fabric ports of that other network switch, such that each network switch is connected to every other network switch in the switch stack.

2. The switch stack of claim 1, wherein each of the fabric ports includes a pluggable interface with a given number of lanes over which to transmit and receive cells, each lane of each pluggable interface being mapped to one of the SerDes channels of the fabric interfaces of the plurality of network processors.

3. The switch stack of claim 2, wherein the pluggable interfaces are CXP interfaces.

4. The switch stack of claim 2, wherein the given number of lanes is twelve.

5. The switch stack of claim 1, wherein the network ports are selected from the group consisting of 10 Gigabit, 40 Gigabit, and 100 Gigabit Ethernet ports.

6. The switch stack of claim 1, wherein each of the SerDes channels has a bandwidth in a range of approximately 10.3 Gbps to 11.5 Gbps.

7. The switch stack of claim 1, wherein each of the SerDes channels has approximately a 25 Gbps bandwidth.

8. A distributed fabric system comprising:
    a plurality of scaled-out fabric coupler (SFC) chassis, each SFC chassis having a plurality of SFC fabric ports and one or more cell-based switch fabric element for switching cells among the SFC fabric ports; and
    a plurality of distributed line card (DLC) chassis, each DLC chassis comprising:
        a plurality of network ports receiving packets over a network;
        a network processor in communication with the network ports, the network processor having a fabric interface that provides a plurality of SerDes (Serializer/Deserializer) channels, the network processor dividing each packet received over the network ports into a plurality of cells and distributing the cells of each received packet across the SerDes channels; and
        a plurality of DLC fabric ports in communication with the fabric interface of the network processor to transmit cells to and receive cells from the fabric interface,
    wherein each DLC fabric port of each DLC chassis is connected to a different one of the SFC chassis by one of the SFC fabric ports of that SFC chassis, such that each DLC chassis is connected to every SFC chassis to form the distributed fabric system.

9. The distributed fabric system of claim 8, wherein each of the DLC fabric ports includes a pluggable interface with a given number of lanes over which to transmit and receive cells, each lane of each pluggable interface being mapped to one of the SerDes channels of the fabric interfaces of the plurality of network processors.

10. The distributed fabric system of claim 9, wherein the pluggable interfaces are CXP interfaces.

11. The distributed fabric system of claim 9, wherein the given number of lanes is twelve.

12. The distributed fabric system of claim 8, wherein the network ports are selected from the group consisting of 10 Gigabit, 40 Gigabit, and 100 Gigabit Ethernet ports.

13. The distributed fabric system of claim 8, wherein each of the SerDes channels has a bandwidth in a range of approximately 10.3 Gbps to 11.5 Gbps.

14. The distributed fabric system of claim 8, wherein each of the SerDes channels has approximately a 25 Gbps bandwidth.

15. A network switch comprising:
    a plurality of network ports receiving packets over a network;
    a network processor in communication with the network ports, the network processor having a fabric interface that provides a plurality of SerDes (Serializer/Deserializer) channels, the network processor dividing each packet received over the network ports into a plurality of cells and distributing the cells of each received packet across the SerDes channels; and
    a plurality of fabric ports in communication with the fabric interface of the network processor to transmit cells to and receive cells from the fabric interface,
    wherein the network switch is selectively configurable as a standalone network switch by connecting each of the fabric ports to one of the other fabric ports of the network switch, as a member of a switch stack by connecting each fabric port of the network switch to another different network switch through one of the fabric ports of that other network switch, or as a member of a distributed fabric system by connecting each fabric port of the network switch to a different scaled-out fabric coupler (SFC) chassis by an SFC fabric port of that SFC chassis.

16. The network switch of claim 15, wherein each of the fabric ports includes a CXP pluggable interface with a given number of lanes over which to transmit and receive cells, each lane of each pluggable interface being mapped to one of the SerDes channels of the fabric interfaces of the plurality of network processors.

* * * * *